United States Patent [19]

Kii

[11] Patent Number: 5,177,411
[45] Date of Patent: Jan. 5, 1993

[54] CRT CORRECTING CIRCUIT

[75] Inventor: Kazuo Kii, Tokyo, Japan

[73] Assignee: Sony Corporation, Tokyo, Japan

[21] Appl. No.: 726,338

[22] Filed: Jul. 5, 1991

[30] Foreign Application Priority Data

Jul. 11, 1990 [JP] Japan .................. 2-181558

[51] Int. Cl.⁵ .................. H01J 29/51; H01J 29/70; G09G 1/04
[52] U.S. Cl. .................. 315/368.18; 315/371; 315/408; 315/395
[58] Field of Search .................. 315/371, 408, 368.11, 315/368.18, 368.19, 370, 393.5

[56] References Cited

U.S. PATENT DOCUMENTS

| | | | |
|---|---|---|---|
| 3,743,882 | 7/1973 | Kroner et al. | 315/368.19 |
| 3,949,269 | 4/1976 | Wheeler | 315/371 |
| 4,097,784 | 6/1978 | Fischman et al. | 315/368.18 |
| 4,814,671 | 3/1989 | Oguino et al. | 315/368 |
| 4,864,197 | 9/1989 | Fitzgerald | 315/408 |
| 4,906,904 | 3/1990 | Togoni | 315/408 |

Primary Examiner—Gregory C. Issing
Attorney, Agent, or Firm—Lewis H. Eslinger; Jay H. Maioli

[57] ABSTRACT

A CRT correcting circuit comprises a correcting deflection coil excited by an alternating signal of a vertical period, a capacitor connected in parallel to the correcting deflection coil to form a resonance circuit, a first field effect transistor of a first conduction type, and a second field effect transistor of a second conduction type. The first and second field effect transistors are turned on and off simultaneously by a pulse signal of a horizontal period. The CRT correcting circuit is capable of operating at a low power consumption and has a simple circuit construction.

2 Claims, 5 Drawing Sheets

CRT CORRECTING CIRCUIT

BACKGROUND OF THE INVENTION

1. Field of the Invention

The present invention relates to a CRT (cathode-ray tube) correcting circuit for correcting the misconvergence of electron beams on a raster formed on a CRT and for correcting quadrupole distortion.

2. Description of the Prior Art

The quality of a picture displayed on a color cathode-ray tube (hereinafter abbreviated to "CRT") having three electron guns and a fluorescent screen which is scanned with electron beams emitted by the three electron guns deteriorates with increase in the deflection angle or in the size of the fluorescent screen due to the misconvergence of the electron beams and the distortion of the beam spots.

FIG. 5 shows an example of the vertical misconvergence of electron beams. Generally, the mislanding of three electron beams, i.e., a red electron beam R, a green electron beam G and a blue electron beam B, occurs in the four corners of a monitor screen to cause color misconvergence in the four corners. Hereinafter, such misconvergence will be referred to as X-misconvergence.

FIG. 6 shows the distortion of the beam spot of an electron beam in the four corners of a monitor screen. Such distortion of the beam spot of an electron beam deteriorates resolution.

Such X-misconvergence in the four corners of a monitor screen, in general, can be corrected by providing a correcting deflection coil on the neck of the CRT and supplying a saw-tooth signal as shown by continuous lines in FIG. 7 to the correcting deflection coil. However, since the upper and lower halves differ from each other in the direction of deviation of the electron beams for the X-misconvergence as shown in FIG. 5, a correction signal as indicated by dotted lines in FIG. 7 must also be supplied to the correcting deflection coil. Accordingly, in correcting the X-misconvergence or quadrupole distortion correction signals of opposite polarities must be used respectively for the upper and lower halves of the monitor screen.

Such correction signals of opposite polarities are produced by a system which amplifies saw-tooth signals by an analog amplifier and subjects the amplified saw-tooth signals to amplitude modulation or by a system as shown in FIG. 8 previously proposed by the applicant of the present patent application which supplies a current from a power source $e_{AC}$ through a choke coil ch to a correcting deflection coil Lc and turns on and off the coil Lc and a resonance capacitor Cc by switching diodes $D_1$ to $D_4$. However, the former system consumes a lot of power and needs a complex device comprising a comparatively large number of parts. Although the latter system is able to operate at a high power efficiency, it is difficult to determine the switching characteristics of the transistor Q for driving the diodes $D_1$ to $D_4$, and the system is unable to provide a satisfactory correcting signal and is expensive because the system needs transformer T.

SUMMARY OF THE INVENTION

The present invention has been made to solve the foregoing problems and it is therefore an object of the present invention to provide a CRT correcting circuit comprising a correcting deflection coil connected to an alternating power source which provides a signal modulated at a vertical period, a capacitor connected in parallel to the correcting deflection coil to form a parallel resonance circuit, and switching field effect transistors forming a bidirectional switching circuit for turning on and off the parallel resonance circuit at a predetermined period.

The switching field effect transistors are turned on and off at a predetermined period to supply saw-tooth signals of opposite polarities directly to the correcting deflection coil. The power consumption of the CRT correcting circuit is comparatively small and the CRT correcting circuit has a simple construction. The CRT correcting circuit can be driven by a signal of a logic level provided by a CMOS circuit because the control pulse signal is of a low voltage.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
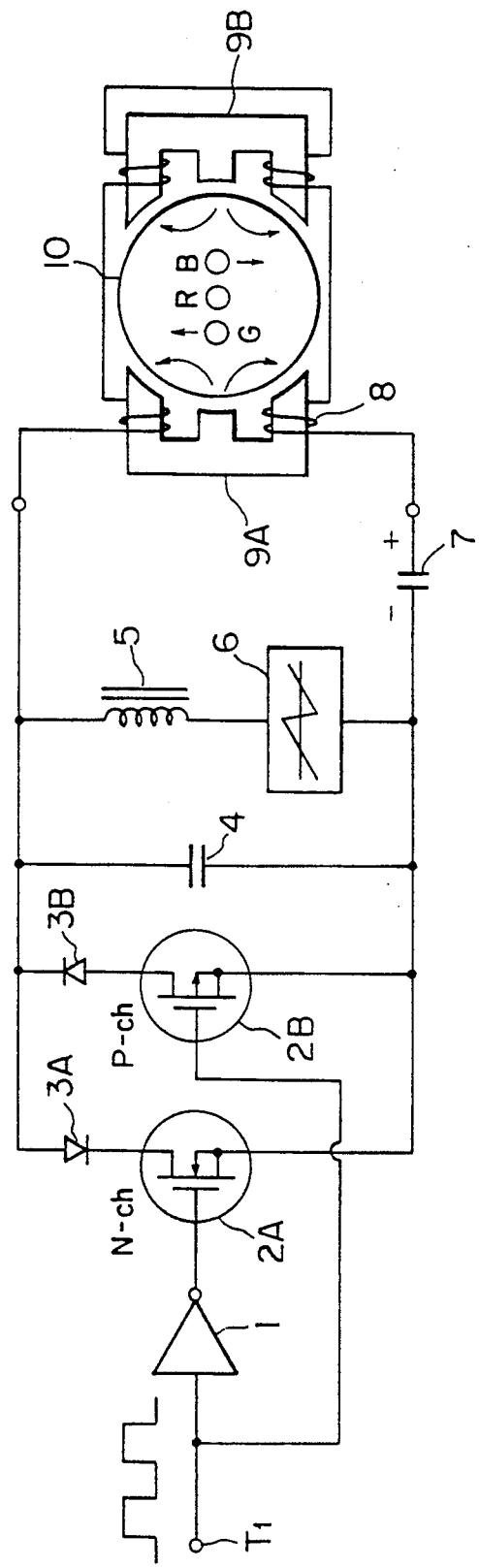
FIG. 1 is a circuit diagram of a CRT correcting circuit in a preferred embodiment according to the present invention.

Referring to FIG. 1 showing a CRT correcting circuit in a first embodiment according to the present invention, there are shown a signal terminal $T_1$ for receiving a pulse signal of a horizontal period, an inverter 1, a switching n-channel field effect transistor 2A, a switching p-channel field effect transistor 2B, diodes 3A and 3B for preventing backward voltage, a resonance capacitor 4, a choke coil 5, an alternating voltage source 6 of a vertical period to provide a saw-tooth signal 6, a dc blocking capacitor 7, a correcting deflection coil 8 wound on a pair of deflection cores 9A and 9B. The dc blocking capacitor 7 is charged through the choke coil 5 and serves as a power supply for the switching operation. The pair of deflection cores 9A and 9B is mounted on the neck of a CRT 10.

Figure 2:
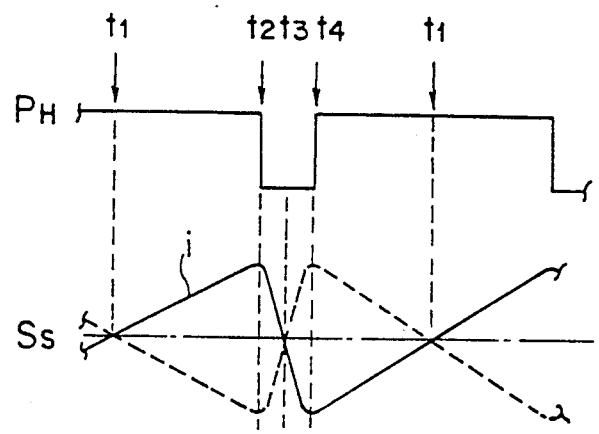
FIGS. 2, 3A and 3B are waveform charts of signals used by the CRT correcting circuit of FIG. 1.

As shown in FIG. 2, when a pulse signal $P_H$ of the horizontal period is applied to the signal terminal $T_1$, the p-channel field-effect transistor 2B and the n-channel field effect transistor 2A are turned on at time t; and a gradually increasing saw-tooth current i flows through the correcting deflection coil 8. At time $t_2$, both the field effect transistors 2A and 2B are turned off, the saw-tooth current i flowing through the deflection correcting coil 8 charges the resonance capacitor 4 and drops sharply to zero by time $t_3$. Then, the parallel resonance circuit resonates with the correcting deflection coil 8 and a current of the opposite polarity flows through the correcting deflecting coil 8. When the current increases to a maximum at time $t_4$, the field effect transistors 2A and 2B are turned on by the pulse signal $P_H$ and, consequently, a saw-tooth signal $S_S$ as shown in FIG. 2 is supplied to the correcting deflection coil 8.

Since the switching circuit of the CRT correcting circuit consists of the n-type field effect transistor 2A and the p-type field effect transistor 2B, the polarity of the output of the alternating voltage source 6 may be either positive or negative for the foregoing correcting operation. When the output voltage of the alternating voltage source 6 is of negative polarity, the saw-tooth current $S_S$ indicated by dotted lines in FIG. 2 is supplied to the correcting deflection coil 8.

Figure 3A:
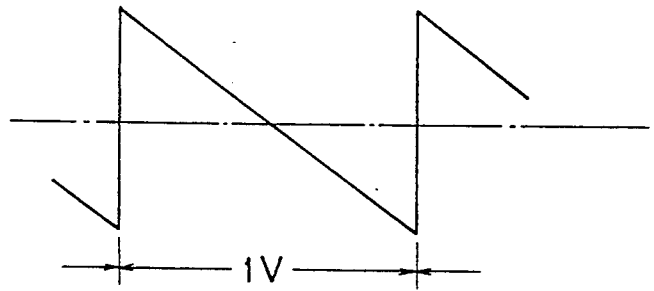
Figure 3B:
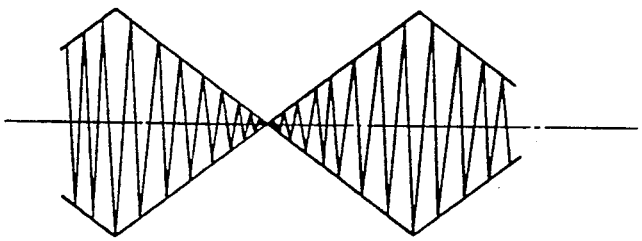

The alternating voltage source 6 provides a saw-tooth signal of a vertical period as shown in FIG. 3A for X-misconvergence correction, and then the CRT correcting circuit provides a bipolar correction signal modulated by a vertical saw-tooth signal, as shown in FIG. 3B. The bipolar correction signal is supplied to the correcting deflection yoke to correct X-misconvergence. The output signal of the alternating voltage source 6 may be, if necessary, a parabolic signal.

Comprising a resonance circuit and a switching circuit, the power consumption of the CRT correcting circuit is very small and the input pulse signal PH consumes power scarcely. The input signal inverted by the inverter 1 may be of a low logic level of ±5 V. The diodes 3A and 3B block the voltage of an inverse polarity to protect the structural diode junctions formed in the field effect transistors 2A and 2B. The diodes 3A and 3B may be omitted when field effect transistors having a high withstand voltage are employed.

Figure 4:
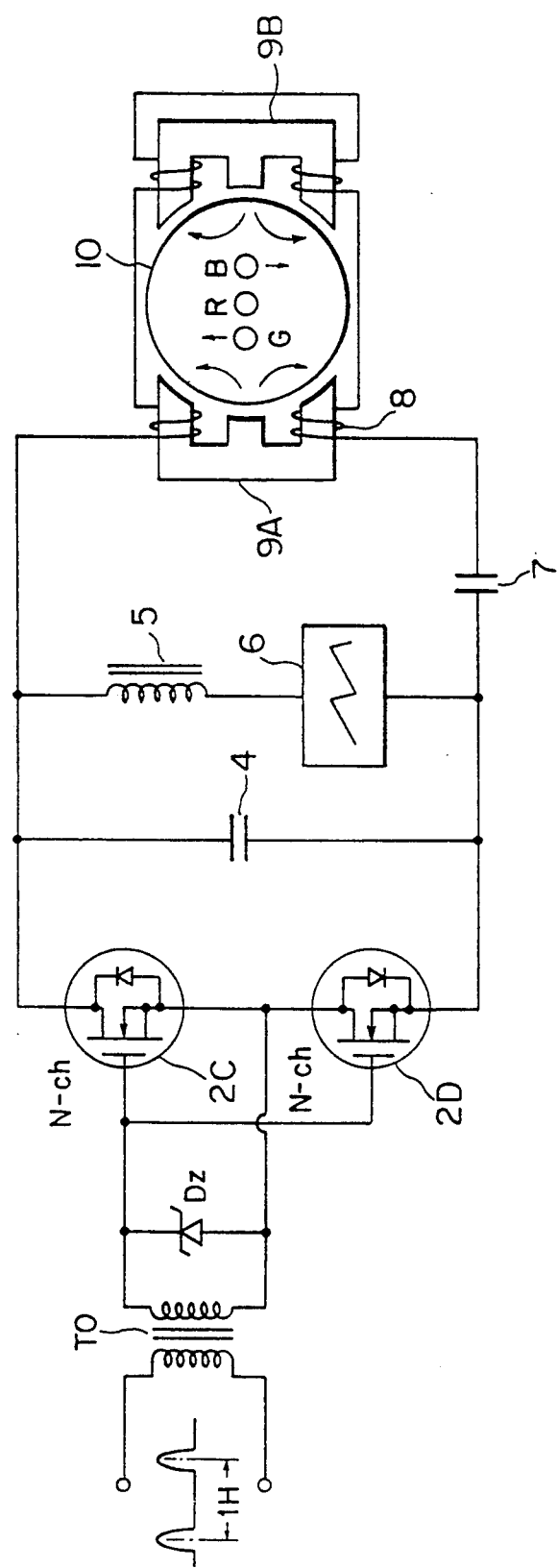
FIG. 4 is a circuit diagram of a CRT correcting circuit in another embodiment according to the present invention.
Figure 5:
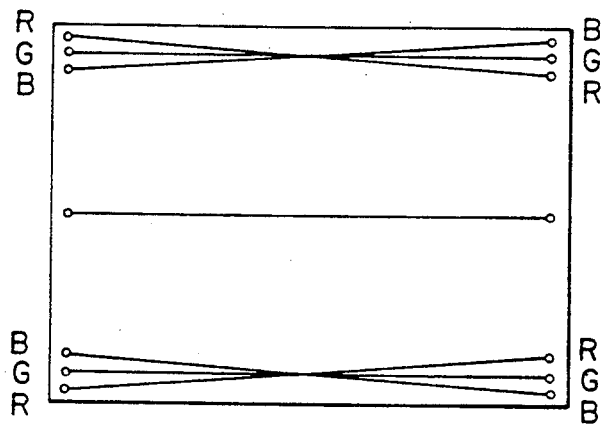
FIG. 5 is a diagram of assistance in explaining X-misconvergence.
Figure 6:
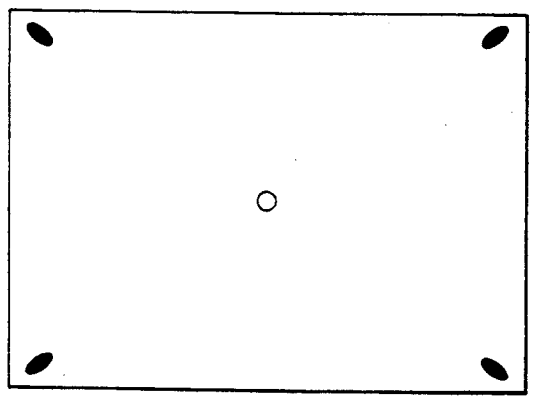
FIG. 6 is a diagram of assistance in explaining the correction of quadrupole distortion.
Figure 7:
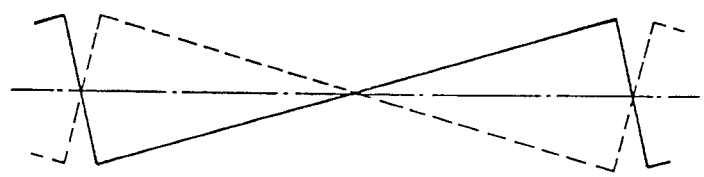
FIG. 7 is a waveform chart of a correcting signal.
Figure 8:
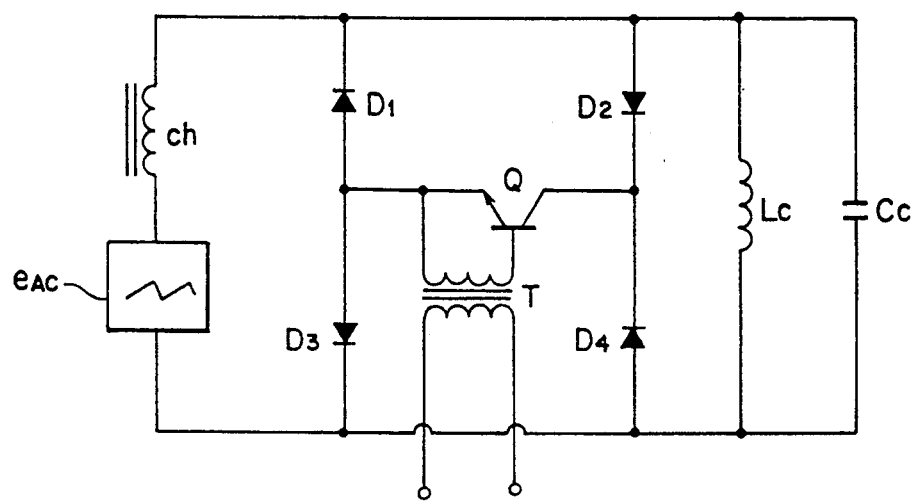
FIG. 8 is a circuit diagram of a prior art CRT correcting circuit.

FIG. 4 shows a CRT correcting circuit in a second embodiment according to the present invention, in which parts like or corresponding to those of the CRT correcting circuit shown in FIG. 1 are denoted by the same reference characters and the description thereof is omitted.

This CRT correcting circuit employs two n-channel field effect transistors 2C and 2D. The n-channel field effect transistors 2C and 2D are connected in series, and the respective sources and respective gates of the field effect transistors 2C and 2D are interconnected, respectively. The field effect transistors 2C and 2D are connected to a driving transformer TO and are controlled for on and off operation by timing similar to that of controlling the field effect transistors 2A and 2B of the foregoing CRT correcting circuit. The CRT correcting circuit has a correcting deflection coil 8 wound on a pair of deflection cores 9A and 9B mounted on the neck of a CRT 10 to deflect the electron beams R and B among three electron beams in opposite directions, respectively, for X-misconvergence correction.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A correcting circuit for correcting misconvergence at corners of a CRT display screen, comprising:
    a correcting deflection coil wound on a deflection core on the CRT and excited by an alternating polarity signal of a vertical period;
    a capacitor connected in parallel to the correcting deflection coil to form a resonance circuit; and
    a first field effect transistor of a first conduction type controlled by a pulse signal of a horizontal period and a second field effect transistor of a second, opposite conduction type forming a switching circuit for short-circuiting the resonance circuit; and
    an invertor receiving said pulse signal of a horizontal period for producing an inverted pulse signal fed to control said second field effect transistor, so that the first and second field effect transistors are each turned on simultaneously and off simultaneously by said pulse signal of a horizontal period and said inverted pulse signal, respectively, so as to supply said alternating signal as signals of opposite polarities to said correcting deflection coil.

2. A correcting circuit for correcting misconvergence at corners of a CRT display screen, comprising:
    a correcting deflection coil arranged on the neck of the CRT and being excited by an alternating polarity signal of a vertical period;
    a capacitor connected in parallel to the correcting deflection coil to form a resonance circuit; and
    first and second field effect transistors of the same conduction type connected in series to form a switching circuit for short-circuiting the resonance circuit;
    characterized in that the first and second field effect transistors are each turned on simultaneously and turned off simultaneously by a pulse signal of a horizontal period, so as to supply a bipolar correction signal modulated by the alternating polarity signal of a vertical period to the correcting deflection coil.

* * * * *